July 17, 1973     M. R. CINES     3,746,754
TEREPHTHALIC ACID PRODUCTION
Filed Jan. 26, 1971
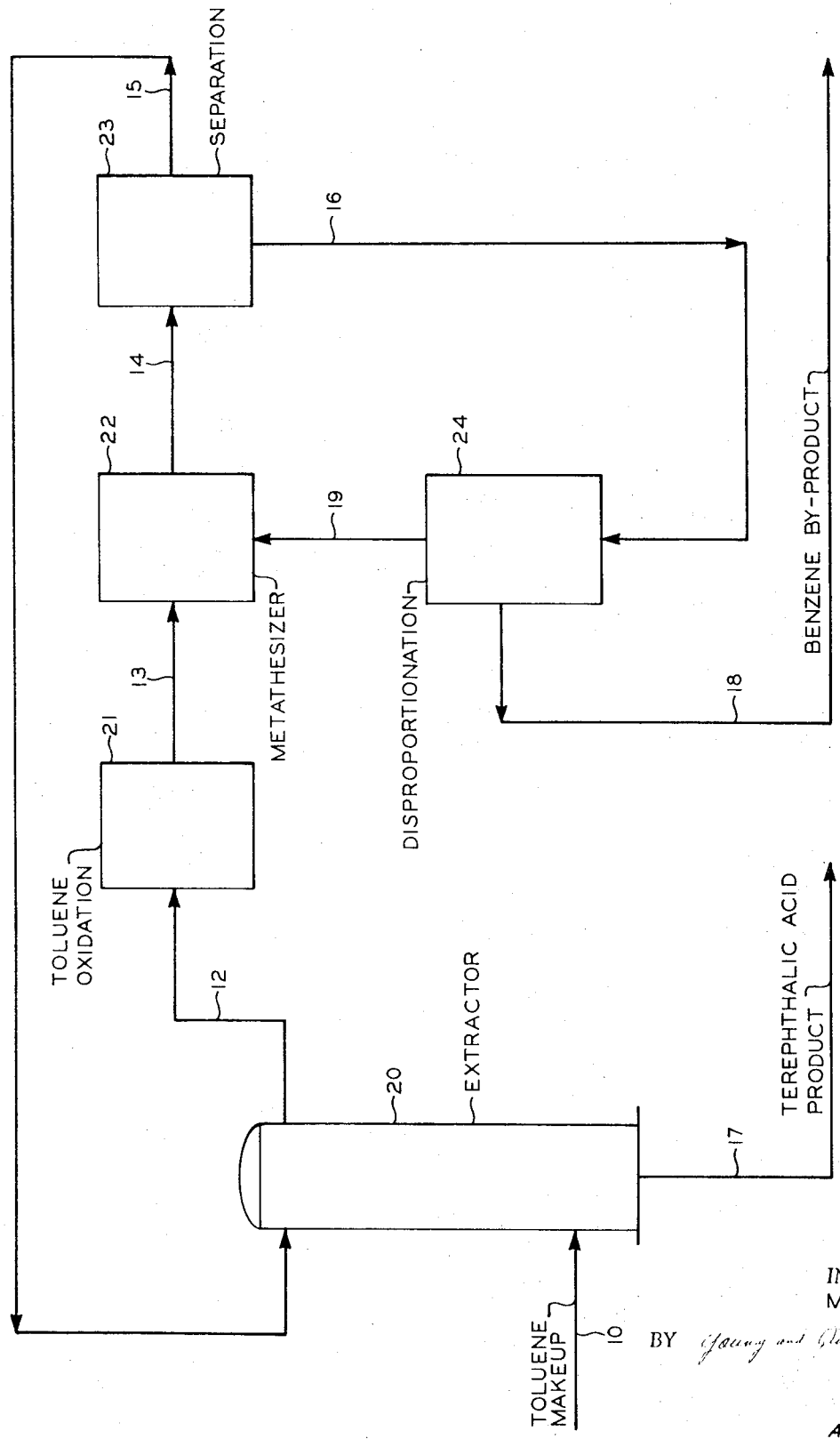
INVENTOR.
M. R. CINES
BY *Young and Quigg*
ATTORNEYS

United States Patent Office 3,746,754
Patented July 17, 1973

3,746,754
TEREPHTHALIC ACID PRODUCTION
Martin R. Cines, Bartlesville, Okla., assignor to
Phillips Petroleum Company
Filed Jan. 26, 1971, Ser. No. 109,911
Int. Cl. C07c 51/42, 63/02
U.S. Cl. 260—524 R                4 Claims

ABSTRACT OF THE DISCLOSURE

In the production of terephthalic acid by toluene oxidation to benzoic acid followed by conversion of benzoic acid to terephthalic acid, the terephthalic acid is purified of benzoic acid by extraction with toluene and passing the toluene-benzoic acid extract directly to the toluene oxidation step.

---

This invention relates to a process for producing terephthalic acid. In another of its aspects, this invention relates to a process for producing terephthalic acid from toluene wherein unconverted benzoic acid remaining with the terephthalic acid is extracted therefrom with toluene and the toluene-benzoic acid mixture is returned to the initial contacting step for conversion to additional benzoic acid. In accordance with a further aspect, this invention relates to a process for purifying terephthalic acid containing benzoic acid impurity by extraction with toluene and passing the toluene-benzoic acid mixture to a toluene oxidation step for conversion to benzoic acid. In accordance with a further aspect, this invention relates to a process of forming terephthalic acid from toluene wherein make-up toluene is introduced into the process by contacting the terephthalic acid product for extraction of benzoic acid therefrom and passing the toluene-benzoic acid to a toluene oxidation step as feed.

Many processes have been developed for the oxidation of alkyl-substituted aromatic hydrocarbons for the production of polybasic aromatic acids. It has been known that monoalkyl benzenes can be oxidized to produce benzoic acid. It has also been known that the benzene carboxylic acids can be neutralized to form salts and subsequently converted to terephthalic acid. One such process for the production of terephthalic acid comprises heating dry alkali metal salts of aromatic monocarboxylic or dicarboxylic acids such as alkali metal benzoates or phthalates to form the terephthalic acid. Although these processes have been known for many years, there is still room for improvement in the operation whereby more advanced results are obtained.

In accordance with the invention, it has been found that the make-up toluene or toluene feed prior to oxidation to benzoic acid can be used to purify terephthalic acid product of impurity benzoic acid by extraction and utilizing the extract comprising toluene and benzoic acid as feed to the oxidation step.

Accordingly, an object of this invention is to provide an improved and economical process for the production of terephthalic acid.

Another object of this invention is to provide a process whereby the feed is used to purify the product.

A further object of this invention is to minimize the amount of separation required in the production of terephthalic acid.

Other objects and aspects, as well as the several advantages of the invention, will be apparent to those skilled in the art upon reading the specification, the drawing and the appended claims.

In accordance with the invention, a process is provided for the production of terephthalic acid which comprises (a) oxidizing toluene to benzoic acid, (b) converting benzoic acid to terephthalic acid, (c) extracting unconverted benzoic acid from the thus-formed terephthalic acid with toluene, and (d) passing the toluene-benzoic acid extract directly to the toluene oxidation step.

Thus, in accordance with the invention, make-up toluene or toluene feedstock for oxidation to benzoic acid is first used as an extractant to recover unconverted benzoic acid from the terephthalic acid product. The toluene in combination with extracted benzoic acid is sent through the oxidation step without further treatment. In this way, fresh toluene can always be used as the extractant without any cost of separation of benzoic acid and toluene. Thus, the invention takes advantage of the fact that toluene is a good solvent for the benzoic acid impurity in the terephthalic acid crystals and that the resulting mixture of toluene and benzoic acid can be passed directly to the toluene oxidation step without a separation step.

In carrying out the invention, if the demand for toluene for extraction exceeds the demand for oxidation, the concentration of benzoic acid can be allowed to increase since the solubility of benzoic acid in toluene far exceeds the amount to be extracted. All make-up toluene for the whole process enters at the extraction step to maintain the benzoic acid concentration in the extraction as low as possible, thereby increasing the driving force for the extraction.

As indicated above, the benzoic acid produced in the toluene oxidation step is ordinarily converted to alkali metal salts such as potassium benzoate which can then be subjected to high temperature treatment in accordance with the known processes for the preparation of aromatic dicarboxylic acids such as terephthalic acid.

A better understanding of the invention will be obtained upon reference to the accompanying drawing, which diagrammatically illustrates one embodiment of the invention.

Referring now to the drawing, toluene make-up or feed is introduced into the system by way of line 10 and passed to a lower portion of extractor 20. Toluene is preferably introduced into a lower portion of extractor 20 and passes upwardly countercurrent to terephthalic acid crystals containing benzoic acid impurity introduced into an upper portion of extractor 20 by way of line 15. Within extractor 20 toluene absorbs benzoic acid impurities from the terephthalic acid crystals and is removed from extractor 20 by way of line 12. Terephthalic acid product substantially freed of benzoic acid impurity is removed as bottoms from extractor 20 by way of line 17.

Extractor 20 can be a vertical tower filled with toluene through which the heavier terephthalic acid crystals descend. The extractor is ordinarily operated at a temperature of about 300° F. and a pressure of about 100 p.s.i.g. A satisfactory tower that can be used can be approximately 25 feet tall and 5 feet in diameter.

The toluene extract containing benzoic acid impurity is passed directly by line 12 to toluene oxidation unit 21 as the feed. The toluene is oxidized in zone 21 to benzoic acid in accordance with known procedures. Various catalysts can be used to facilitate the oxidation of toluene to benzoic acid. The oxidation temperature is usually sufficiently high that the desired oxidation reaction occurs and yet not so high as to cause undesirable charring or formation of tars. Temperatures in the range of about 120 to about 275° C., preferably 150 to 250° C., can be employed. The reaction time should be sufficient to obtain a desirable conversion of the toluene to benzoic acid, for example, in the range of about 0.5 to 25 hours or more. The oxygen used for oxidation can be in the form of substantially 100 percent oxygen gas or in the form of gaseous mixtures containing lower concentrations of oxygen such as, for example, air. Suitable catalysts that can be employed include a heavy metal oxidation catalyst plus bromine. Those metals having an atomic number not greater than 84 have been found most suitable. Excellent results are obtained by the utilization of a metal having an atomic number of 23 to 28 inclusive. Particularly good results are obtained with a metal of the group consisting of manganese, cobalt, nickel, chromium, vanadium, molybdenum, tungsten, tin, and cerium. A single metal or a combination of metals may be used. The metal may be added in elemental, combined, or ionic form and the bromine may be added similarly in elemental, combined, or ionic form. As a source of ionic bromine, ammonium bromide or other bromine compounds soluble in the reaction medium may be employed. Satisfactory results have been obtained, for example, with potassium bromate, tetrabromoethane, and benzyl bromide.

The metal may be supplied in the form of metal compounds. For example manganese acetate may be used as well as the manganese salts of the borates, halides, and nitrates.

As a specific example, one part by weight cobalt acetate, two parts by weight manganese acetate (as the tetrahydrates) and three parts by weight tetrabromoethane are used as the catalyst.

The effluent removed from oxidation zone 21 by way of line 13 is comprised principally of benzoic acid and is introduced into metathesizer 22 wherein an exchange reaction (metathesis) takes place betwen benzoic acid and dipotassium terephthalate (introduced via line 19) to produce terephthalic acid and potassium benzoate. The effluent removed from metathesizer 22 by way of line 14 is comprised principally of potassium benzoate and terephthalic acid and is passed to separation zone 23 wherein the potassium benzoate is separated from terephthalic acid and unconverted benzoic acid. The terephthalic acid containing benzoic acid impurity is passed by way of line 15 to extractor 20.

The potassium benzoate separated in zone 23 is removed by line 16 and passed to disproportionation unit 24 where it is converted to dipotassium terephthalate and benzene. Benzene is removed from disproportionation zone 24 by way of line 18. The potassium benzoate introduced by way of line 16 is converted in part to dipotassium terephthalate in zone 24, is removed by way of line 19 and passed to neutralizer 22 as described above.

The disproportionation of potassium benzoate to dipotasssium terephthalate and benzene is a well known reaction and disclosed in detail in numerous patents, for example U.S. 2,794,830. Very briefly the solid potassium benzoate is heated in an atmosphere of carbon dioxide to a temperature generally above 340° C. in the presence of a metal catalyst such as lead, zinc, and cadmium. Preferred catalysts are zinc compounds such as zinc oxide, zinc carbonate, zinc acetate, zinc benzoate and the corresponding cadmium compounds.

About one part by weight of catalyst such as cadmium oxide is mixed in the solid state with about 10 to 25 parts by weight of potassium benzoate and the solid blend charged to a relatively high-pressure, high-temperature reactor. The reactor is charged with carbon dioxide to a pressure of about 50 atmospheres and then heated to a temperature of about 400° C. The reaction takes place over a period of about 3 hours. At the end of the reaction period the reactor is vented into a benzene recovery unit for recovery of the benzene by-product. The solid reaction product remaining in the reactor is dissolved in boiling water using about 3 parts by weight of water per part of solid product. The aqueous solution is filtered for removal of catalyst residue and then passed to the metathesis step wherein benzoic acid is added for reaction with the dipotassium terephthalate to "spring" the terephthalic acid. Approximately an equal part of benzoic acid is used per part of contained dipotassium salt. The metathesis or exchange reaction takes place at a temperature of about 130° C. in a stirred vessel and requires about 2 hours. The terephthalic acid precipitates as solid crystals during the reaction. The reaction effluent is passed to a separation zone and filtered at a temperature of 130° C. for separation of the terephthalic acid crystals from the filtrate consisting of a water solution of benzoic acid and potassium benzoate, the latter being the other product of the exchange reaction. The crystals are passed to a toluene extraction column for purification. The filtrate is evaporated to dryness to obtain a residue consisting essentially of solid potassium benzoate. Additional cadmium oxide is added to the solid residue and the mixture passed to the disproportionation reactor to complete the cycle. Additional details of the metathesis and crystal separation steps may be found in U.S. Pat. 2,905,709.

SPECIFIC EXAMPLE

This example illustrates the production of terephthalic acid in accordance with the accompanying flow diagram wherein all make-up toluene to the process enters at the extraction step and separation of the toluene extract into its components is unnecessary. In accordance with this example, terephthalic acid is produced by the process comprising toluene oxidation to benzoic acid, benzoic acid conversion to potassium benzoate, disproportionation of potassium benzoate to benzene and dipotassium terephthalate, and reaction of dipotassium terephthalate with benzoic acid to yield the terephthalic acid product wherein the terephthalic acid product is purified of residual benzoic acid by toluene extraction and passage of the toluene-benzoic acid extract directly to the toluene oxidation step.

A material balance set forth below illustrates the invention wherein a process utilizing 64,000 pounds per hour of toluene is employed which is charged to the extraction unit for removing benzoic acid impurity from the terephthalic acid crystal product. The stream numbers referred to in the material balance correspond to the streams in the drawing.

| Stream number | Material balance, lb./hr. | | | | | | | | |
|---|---|---|---|---|---|---|---|---|---|
| | 10 | 12 | 13 | 14 | 16 | 15 | 17 | 18 | 19 |
| Component: | | | | | | | | | |
| Toluene | 64,000 | 64,000 | | | | | | | |
| Benzoic acid | | | 1,975 | 65,975 | | 1,975 | | | |
| Potassium benzoate | | | | | 86,475 | 86,475 | | | |
| Terephthalic acid | | | | 42,900 | | 42,900 | 42,900 | | |
| Benzene | | | | | | | | 21,100 | |
| Dipotassium terephthalate | | | | | | | | | 65,375 |

In the above example the make-up toluene feedstock serves to purify the terephthalic acid product and the resultant toluene-benzoic acid impurity mixture passed directly to the toluene oxidation unit. The usual procedure is to purify the terephthalic acid crystals by water or alcohol washing. All make-up toluene ordinarily is introduced directly to the oxidation unit, not into an extraction unit as illustrated by the invention. The usual procedure is that the benzoic acid recovered in the water washings would have to be recovered in a troublesome, extra step. The instant invention takes advantage of the fact that toluene is a good solvent for the benzoic acid impurity in the terephthalic acid crystals and the resulting mixture of toluene and benzoic acid is passed directly to the toluene oxidation unit without a separation step.

I claim:
1. A process for the production of terephthalic acid which comprises:
   (a) oxidizing toluene to benzoic acid by contacting toluene and oxygen in the presence of an oxidation catalyst under oxidation conditions at a temperature and contacting time sufficient to substantially convert toluene to benzoic acid,
   (b) converting benzoic acid formed in step (a) to terephthalic acid by an exchange reaction between benzoic acid and dipotassium terephthalate in a metathesizer zone under conditions to produce terephthalic acid and potassium benzoate,
   (c) extracting unconverted benzoic acid from the terephthalic acid thus formed by contacting with toluene, and
   (d) passing the toluene-benzoic acid extract formed in step (c) directly to the toluene oxidizing step (a).

2. A process according to claim 1 wherein step (b) comprises converting benzoic acid to potassium benzoate, disproportionating the potassium benzoate to benzene and dipotassium terephthalate, and reaction of dipotassium terephthalate with benzoic acid to yield terephthalic acid containing benzoic acid impurity.

3. A process according to claim 1 wherein prior to extracting with toluene the effluent removed from step (b) is passed to a separation zone wherein potassium benzoate is separated from terephthalic acid and unconverted benzoic acid.

4. A process according to claim 3 further comprising passing the separated potassium benzoate to a disproportionation zone and contacting same with carbon dioxide in the presence of a catalyst at an elevated temperature to produce dipotassium terephthalate and benzene, separating dipotassium terephthalate from said benzene, and passing said dipotassium terephthalate to said metathesizer zone in step (b) as the source of dipotassium terephthalate.

References Cited
UNITED STATES PATENTS

| | | | |
|---|---|---|---|
| 2,794,830 | 6/1957 | Raecke et al. | 260—515 |
| 3,225,088 | 12/1965 | Takagi et al. | 260—515 |
| 3,228,963 | 1/1966 | Joo et al. | 260—515 |

LORRAINE A. WEINBERGER, Primary Examiner

R. S. WEISSBERG, Assistant Examiner

U.S. Cl. X.R.

260—515 P, 525